United States Patent Office.

SAMUEL B. SPAULDING, OF BRANDON, VERMONT.

Letters Patent No. 66,407, dated July 2, 1867.

IMPROVEMENT IN THE MANUFACTURE OF BRICKS.

*The Schedule referred to in these Letters Patent and making part of the same.*

Be it known that I, SAMUEL B. SPAULDING, of Brandon, in the county of Rutland, in the State of Vermont, have invented a new and improved Mode of Manufacturing Bricks. I do hereby declare that the following is a full and exact description thereof.

The nature of my invention consists in facing the bricks, after they are moulded and partially or perfectly dry, with a composition composed of clay and ochre, or clay and the waste from the copperas manufactories, or clay mixed with the waste of ochre or paint-works.

In the operation I have a shallow box, mounted on legs, with a bottom of hard wood, into which I put the ingredients for facing; I have them wet up with water sufficiently for a paste of proper consistency. The edges of the bricks, which are to be exposed to the weather, are then rubbed on the bottom of the box in the paste, which renders the edges smooth, and incorporates the paste into the bricks.

The benefits of my invention consist in giving a smooth surface to the edges of the bricks, and in the operation of burning the bricks. The iron in the materials for the paste is oxidized, and gives the bricks a peculiar and beautiful red shade or reddish brown.

What I claim as my invention, and desire to secure by Letters Patent, is—

The composition for the paste, and the manner of its application, for the purposes herein set forth.

S. B. SPAULDING.

Witnesses:
GEO. L. FLETCHER,
J. Q. HAWKINS.